US012764623B2

(12) United States Patent
Chen et al.

(10) Patent No.: US 12,764,623 B2
(45) Date of Patent: Oct. 13, 2026

(54) METHOD, USER EQUIPMENT, NETWORK NODE

(71) Applicant: NEC Corporation, Tokyo (JP)

(72) Inventors: Yuhua Chen, London (GB); Neeraj Gupta, London (GB); Ayesha Ijaz, Guildford (GB)

(73) Assignee: NEC CORPORATION, Tokyo (JP)

( * ) Notice: Subject to any disclaimer, the term of this patent is extended or adjusted under 35 U.S.C. 154(b) by 299 days.

(21) Appl. No.: 18/579,564

(22) PCT Filed: Jun. 30, 2022

(86) PCT No.: PCT/JP2022/026304
§ 371 (c)(1),
(2) Date: Jan. 16, 2024

(87) PCT Pub. No.: WO2023/002833
PCT Pub. Date: Jan. 26, 2023

(65) Prior Publication Data
US 2024/0349145 A1 Oct. 17, 2024

(30) Foreign Application Priority Data
Jul. 22, 2021 (GB) .................................... 2110569

(51) Int. Cl.
*H04W 36/08* (2009.01)
*H04W 36/00* (2009.01)
*H04W 36/16* (2009.01)

(52) U.S. Cl.
CPC ... *H04W 36/083* (2023.05); *H04W 36/00837* (2018.08); *H04W 36/08* (2013.01); *H04W 36/16* (2013.01)

(58) Field of Classification Search
CPC ......... H04W 36/083; H04W 36/00837; H04W 36/08; H04W 36/16; H04W 36/00; H04W 84/06; H04W 36/0005; H04B 7/1851
See application file for complete search history.

(56) References Cited

U.S. PATENT DOCUMENTS 11,271,699 B1 * 3/2022 Eyuboglu ............ H04J 11/0079
2015/0092746 A1 * 4/2015 Jang .................. H04W 36/0094
370/331
(Continued)

FOREIGN PATENT DOCUMENTS

CN 107431526 A * 12/2017 ......... H04B 7/18554
CN 111371487 A 7/2020
KR 20120094496 A * 8/2012 ............ H04W 72/20

OTHER PUBLICATIONS

3GPP (3GPP TR 38.821, V16.1.0, May 2021, 3rd Generation Partnership Project; Technical Specification Group Radio Access Network; Solutions for NR to support non-terrestrial networks (NTN), Release 16; hereinafter 3GPP821) (Year: 2021).*
(Continued)

*Primary Examiner* — Michael A Keller
(74) *Attorney, Agent, or Firm* — Sughrue Mion, PLLC

(57) ABSTRACT

A communication system comprising a non-terrestrial network part is disclosed in which a user equipment (UE) is served by one of the cells of the non-terrestrial network part. The UE determines whether to delay/suspend a small data transmission, based one or more associated parameters, so as to avoid a radio link failure or a handover. When the transmission is delayed/suspended, the UE initiates/resumes the data transmission in a new serving cell (e.g. after cell reselection or RRC establishment in the new cell), or via a relay (e.g. a device-to-device relay).

17 Claims, 8 Drawing Sheets

(56) References Cited

U.S. PATENT DOCUMENTS

| | | | | |
|---|---|---|---|---|
| 2018/0184307 | A1* | 6/2018 | Periyasamy | H04M 15/61 |
| 2019/0174276 | A1* | 6/2019 | Mineiro Ramos de Azevedo | H04W 4/44 |
| 2019/0205115 | A1* | 7/2019 | Gomes | H04W 4/50 |
| 2022/0124624 | A1* | 4/2022 | Sha | H04W 52/0229 |
| 2024/0314664 | A1* | 9/2024 | Sharma | H04W 36/08 |

OTHER PUBLICATIONS

3GPP Tr 36.763 V0.0.0 (Dec. 2020), Technical Report, 3rd Generation Partnership Project; Technical Specification Group Radio Access Network; Study on Narrow-Band Internet of Things (NB-IoT) / enhanced Machine Type Communication (eMTC) support for Non-Terrestrial Networks (NTN) (Release 17); 2020 (Year: 2020).*

NPL Caching-Aware Intelligent Handover Strategy for LEO Satellite Networks, Leng Jun. 7, 2021 (Year: 2021).*

3GPP TS 38.304 V16.4.0 (Mar. 2021), 3rd Generation Partnership Project; Technical Specification Group Radio Access Network; NR; User Equipment (UE) procedures in Idle mode and RRC Inactive state (Release 16); 2021 (Year: 2021).*

International Search Report for PCT Application No. PCT/JP2022/026304, mailed on Nov. 16, 2022.

Written opinion for PCT Application No. PCT/JP2022/026304, mailed on Nov. 16, 2022.

3GPP TR 36.763 V17.0.0 (Jun. 2021).

3GPP TR 38.811 V15.4.0 (Sep. 2020).

3GPP TR 38.821 V16.1.0 (May 2021).

3GPP TS 38.300 V16.6.0 (Jun. 2021).

3GPP TS 37.340 V16.6.0 (Jun. 2021).

Huawei et al: "Discussion on mobility enhancement for IoT NTN", 3GPP TSG RAN WG2 #114-e, R2-2105663, May 10, 2021.

Spreadtrum Communications: "Discussion on the issue of mobility for IoT over NTN", 3GPP TSG-RAN WG2 Meeting #114-e, R2-2105545, May 11, 2021.

NEC: "Further discussion on CHO in NTN", 3GPP TSG-RAN WG2 Meeting #114, R2-2106024, May 11, 2021.

NEC: "Analysis on Mobility Aspects for IoT NTN", 3GPP TSG RAN WG2#116-e, R2-2110770, Oct. 22, 2021.

NEC: "Mobility Enhancement for IoT NTN", 3GPP TSG-RAN WG2 Meeting #115, R2-2108328, Aug. 6, 2021.

* cited by examiner

METHOD, USER EQUIPMENT, NETWORK NODE

This application is a National Stage Entry of PCT/JP2022/026304 filed on Jun. 30, 2022, which claims priority from GB Patent Application 2110569.7 filed on Jul. 22, 2021, the contents of all of which are incorporated herein by reference, in their entirety.

TECHNICAL FIELD

The present disclosure relates to a wireless communication system and devices thereof operating according to the 3rd Generation Partnership Project (3GPP) standards or equivalents or derivatives thereof. The disclosure has particular but not exclusive relevance to improvements relating to Internet-of-Things (IoT) devices in the so-called Long Term Evolution (LTE) systems ('4G') or in the so-called 'Next Generation' ('5G') systems employing a non-terrestrial portion comprising airborne or spaceborne network nodes.

BACKGROUND ART

Under the 3GPP standards, a NodeB (or an 'eNB' in LTE, 'gNB' in 5G) is a base station via which communication devices connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. End-user communication devices are commonly referred to as User Equipment (UE) which may be operated by a human or comprise automated devices. Such mobile (or even generally stationary) devices are typically operated by a user (and hence they are often collectively referred to as user equipment, 'UE') although it is also possible to connect IoT devices and similar Machine-Type Communication (MTC) devices to the network. For simplicity, the present application will use the term base station to refer to any such base stations and use the term mobile device or UE to refer to any such communication device.

The latest developments of the 3GPP standards cover an evolving communication technology that is expected to support a variety of applications and services such as MTC, IoT/Industrial IoT (IIoT) communications, vehicular communications and autonomous cars, high resolution video streaming, smart city services, and/or the like.

In order to provide enhanced support for MTC devices, 3GPP introduced the 'eMTC' (enhanced MTC) UE category in Release 12, and specified the first low-complexity UE category 0 (Cat-0). Cat-0 supports a reduced peak data rate of 1 Mbps, a single antenna and half duplex frequency division duplex (HD FDD) operation. 3GPP Release 13 introduced support for the so-called 'Cat-M1' UEs which allows additional cost reduction due to a reduced transmission and reception bandwidth of 1.08 MHz, the introduction of a lower UE power class of 20 dBm in addition to the 23 dBm power class. Cat-M1 UEs operate in a narrowband (NB) and they may also support coverage enhanced (CE) operation. In LTE Releases 14 and 15, a new UE category Cat-M2 was specified with 5 MHz transmission and reception bandwidth.

In Release 13 3GPP started to work on Narrowband Internet-of-Things (NB-IoT) UE with the total baseband bandwidth of 180 KHz. NB-IoT supports operation on an anchor carrier (where the UE assumes certain signal and channels being transmitted) and on a non-anchor carrier (where such signal and channels are not assumed to be transmitted). Similarly to eMTC, NB-IoT makes use of increased acquisition times and time repetitions to extend the system coverage. However, unlike MTC, NB-IoT does not support measurement reporting and handover in connected mode.

3GPP is also working on specifying an integrated satellite and terrestrial network infrastructure. For example, NPL 1 is a study on Narrow-Band Internet of Things (NB-IoT)/enhanced Machine Type Communication (eMTC) support for Non-Terrestrial Networks in Release 17. The term Non-Terrestrial Networks (NTN) refers to networks, or segments of networks, that are using an airborne or spaceborne vehicle for transmission. Satellites refer to spaceborne vehicles in Geostationary Earth Orbit (GEO) or in Non-Geostationary Earth Orbit (NGEO) such as Low Earth Orbits (LEO), Medium Earth Orbits (MEO), and Highly Elliptical Orbits (HEO). Airborne vehicles refer to High Altitude Platforms (HAPs) encompassing Unmanned Aircraft Systems (UAS)—including tethered UAS, Lighter than Air UAS and Heavier than Air UAS—all operating quasi-stationary at an altitude typically between 8 and 50 km.

NPL 2 is a study on New Radio to support such Non-Terrestrial Networks. The study includes, amongst others, NTN deployment scenarios and related system parameters (such as architecture, altitude, orbit etc.) and a description of adaptation of 3GPP channel models for Non-Terrestrial Networks (propagation conditions, mobility, etc.). NPL 3 provides further details about NTN.

NTN access typically features the following elements (amongst others):

- NTN Terminal: It may refer to a 3GPP UE or a terminal specific to the satellite system in case the satellite doesn't serve directly 3GPP UEs.
- A service link which refer to the radio link between the user equipment and the space/airborne platform (which may be in addition to a radio link with a terrestrial based RAN).
- A space or an airborne platform.
- Gateways ('NTN Gateways') that connect the satellite or aerial access network to the core network. It will be appreciated that gateways will mostly likely be co-located with a base station.
- Feeder links which refer to the radio links between the gateways and the space/airborne platform.

Satellite or aerial vehicles may generate several beams over a given area to provide respective NTN cells. The beams have a typically elliptic footprint on the surface of the Earth.

3GPP intends to support three types of NTN beams or cells:

- Earth-fixed cells characterized by beam(s) covering the same geographical areas all the time (e.g. GEO satellites and HAPS);
- quasi-Earth-fixed cells characterized by beam(s) covering one geographic area for a finite period and a different geographic area during another period (e.g. NGEO satellites generating steerable beams); and
- Earth-moving cells characterized by beam(s) covering one geographic area at one instant and a different geographic area at another instant (e.g. NGEO satellites generating fixed or non-steerable beams).

With satellite or aerial vehicle keeping position fixed in terms of elevation/azimuth with respect to a given earth point e.g. GEO and UAS, the beam footprint is earth fixed.

With satellite circulating around the earth (e.g. LEO) or on an elliptical orbit around the earth (e.g. HEO) the beam footprint may be moving over the Earth with the satellite or aerial vehicle motion on its orbit. Alternatively, the beam footprint may be Earth-fixed (or quasi-Earth-fixed) temporarily, in which case an appropriate beam pointing mechanism (mechanical or electronic steering) may be used to compensate for the satellite or aerial vehicle motion.

LEO satellites may have steerable beams in which case the beams are temporarily directed to substantially fixed footprints on the Earth. In other words, the beam footprints (which represent NTN cell) are stationary on the ground for a certain amount of time before they change their focus area over to another NTN cell (due to the satellite's movement on its orbit). From cell coverage/UE point of view, this results in cell changes happening regularly at discrete intervals because different Physical Cell Identities (PCIs) and/or Synchronization Signal/Physical Broadcast Channel (PBCH) blocks (SSBs) have to be assigned after each service link change, even when these beams serve the same land area (have the same footprint). LEO satellites without steerable beams cause the beams (cells) moving on the ground constantly in a sweeping motion as the satellite moves along its orbit and as in the case of steerable beams, service link change and consequently cell changes happen regularly at discrete intervals. Similarly to service link changes, feeder link changes also happen at regular intervals due to the satellite's movement on its orbit.

As described in NPL 1, 3GPP's current approach is that existing cellular IoT features specified up to Release 16 (such as support of 4G/5G core network, Early Data Transmission (EDT), Preconfigured Uplink Resources (PUR), Self-Organising Network (SON) functionality, etc.) can be enabled in NTN deployments unless they require major change for adaptation to NTN.

CITATION LIST

Non Patent Literature

NPL 1: 3GPP TR 36.763 V17.0.0
NPL 2: 3GPP TR 38.811 V15.4.0
NPL 3: 3GPP TR 38.821 V16.1.0
NPL 4: 3GPP TS 38.300 V16.6.0
NPL 5: 3GPP TS 37.340 V16.6.0

SUMMARY OF INVENTION

Technical Problem

However, there are a number of features that still have not been specified for NB-IoT operation, including: support of 5G core; adjustments to existing mobility mechanisms to adapt functionality to NTN (such as new parameter values, timings etc.); support of discontinuous coverage without excessive UE power consumption and without excessive failures/recovery actions; and enhancements to existing power saving mechanisms (e.g. DRX, PSM, eDRX, relaxed monitoring, and WUS).

The inventors have realised that, due to the intermittent availability of NTN cells and the relatively frequent cell changes caused by movement of the satellite/aerial vehicle, NB-IoT devices (even stationary ones) may experience Radio Link Failure (RLF) and then need to re-establish RRC connection to the upcoming cell to complete their data transmission. Another potential issue is that MTC UEs (even stationary ones) may need to perform a handover to complete their data transmission, which would result in excessive signalling overhead and/or increased battery consumption. Since NB-IoT and MTC devices (and in some cases other UEs) are expected to have relatively short/small data transmissions, such inefficiencies should be avoided.

Accordingly, the present disclosure seeks to provide methods and associated apparatus that address or at least alleviate (at least some of) the above described issues.

Solution to Problem

Although for efficiency of understanding for those of skill in the art, the disclosure will be described in detail in the context of a 3GPP system (LTE/5G networks including NTN), the principles of the disclosure can be applied to other systems as well.

In one aspect, the disclosure provides a method performed by a user equipment (UE) configured to communicate via a non-terrestrial network comprising a plurality of cells, the method comprising: determining, based on at least one parameter, whether to delay a data transmission to perform cell reselection; and initiating the data transmission, before or after cell reselection, based on a result of said determination.

In one aspect, the disclosure provides a method performed by a user equipment (UE) configured to communicate via a non-terrestrial network comprising a plurality of cells including a current cell of the UE, the method comprising: determining, based on at least one parameter, that a radio link failure (RLF) is about to occur with respect to a data transmission in the current cell; and proceeding with the data transmission in a new cell, after declaring RLF for the current cell.

In one aspect, the disclosure provides a method performed by a user equipment (UE) configured to communicate via a non-terrestrial network comprising a plurality of cells, the method comprising: determining that a radio link failure is about to occur in a current cell of the UE before completion of a data transmission via that cell; and proceeding with said data transmission via a relay device based on said determination.

In one aspect, the disclosure provides a method performed by a network node configured to communicate with a user equipment (UE) via a non-terrestrial network comprising a plurality of cells, the method comprising: providing at least one parameter to the UE, for use in determining whether to delay a data transmission to perform cell reselection and to initiate the data transmission before or after cell reselection.

In one aspect, the disclosure provides a method performed by a network node configured to communicate with a user equipment (UE) via a non-terrestrial network comprising a plurality of cells, the method comprising: providing at least one parameter to the UE, for use in determining whether a radio link failure (RLF) is about to occur with respect to a data transmission in a current cell of the UE and for proceeding with the data transmission in a new cell, after declaring RLF for the current cell.

In one aspect, the disclosure provides a method performed by a network node configured to communicate with a user equipment (UE) via a non-terrestrial network comprising a plurality of cells, the method comprising: providing at least one parameter to the UE, for use in determining that a radio link failure is about to occur in a current cell of the UE before completion of a data transmission via that cell and for proceeding with said data transmission via a relay device based on said determination.

In one aspect, the disclosure provides a user equipment (UE) configured to communicate via a non-terrestrial network comprising a plurality of cells, the UE comprising: means (for example a memory, a transceiver and a processor) for determining, based on at least one parameter, whether to delay a data transmission to perform cell reselection; and means for initiating the data transmission, before or after cell reselection, based on a result of said determination.

In one aspect, the disclosure provides a user equipment (UE) configured to communicate via a non-terrestrial network comprising a plurality of cells including a current cell of the UE, the UE comprising: means (for example a memory, a transceiver and a processor) for determining, based on at least one parameter, that a radio link failure (RLF) is about to occur with respect to a data transmission in the current cell; and means for proceeding with the data transmission in a new cell, after declaring RLF for the current cell.

In one aspect, the disclosure provides a user equipment (UE) configured to communicate via a non-terrestrial network comprising a plurality of cells, the UE comprising: means (for example a memory, a transceiver and a processor) for determining that a radio link failure is about to occur in a current cell of the UE before completion of a data transmission via that cell; and means for proceeding with said data transmission via a relay device based on said determination.

In one aspect, the disclosure provides a network node configured to communicate with a user equipment (UE) via a non-terrestrial network comprising a plurality of cells, the network node comprising: means (for example a memory, a transceiver and a processor) for providing at least one parameter to the UE, for use in determining whether to delay a data transmission to perform cell reselection and to initiate the data transmission before or after cell reselection.

In one aspect, the disclosure provides a network node configured to communicate with a user equipment (UE) via a non-terrestrial network comprising a plurality of cells, the network node comprising: means (for example a memory, a transceiver and a processor) for providing at least one parameter to the UE, for use in determining whether a radio link failure (RLF) is about to occur with respect to a data transmission in a current cell of the UE and for proceeding with the data transmission in a new cell, after declaring RLF for the current cell.

In one aspect, the disclosure provides a network node configured to communicate with a user equipment (UE) via a non-terrestrial network comprising a plurality of cells, the network node comprising: means (for example a memory, a transceiver and a processor) for providing at least one parameter to the UE, for use in determining that a radio link failure is about to occur in a current cell of the UE before completion of a data transmission via that cell and for proceeding with said data transmission via a relay device based on said determination.

Aspects of the disclosure extend to corresponding systems and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the disclosure independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the disclosure will now be described, by way of example, with reference to the accompanying drawings in which.

DESCRIPTION OF EMBODIMENTS

Overview

Figure 1:
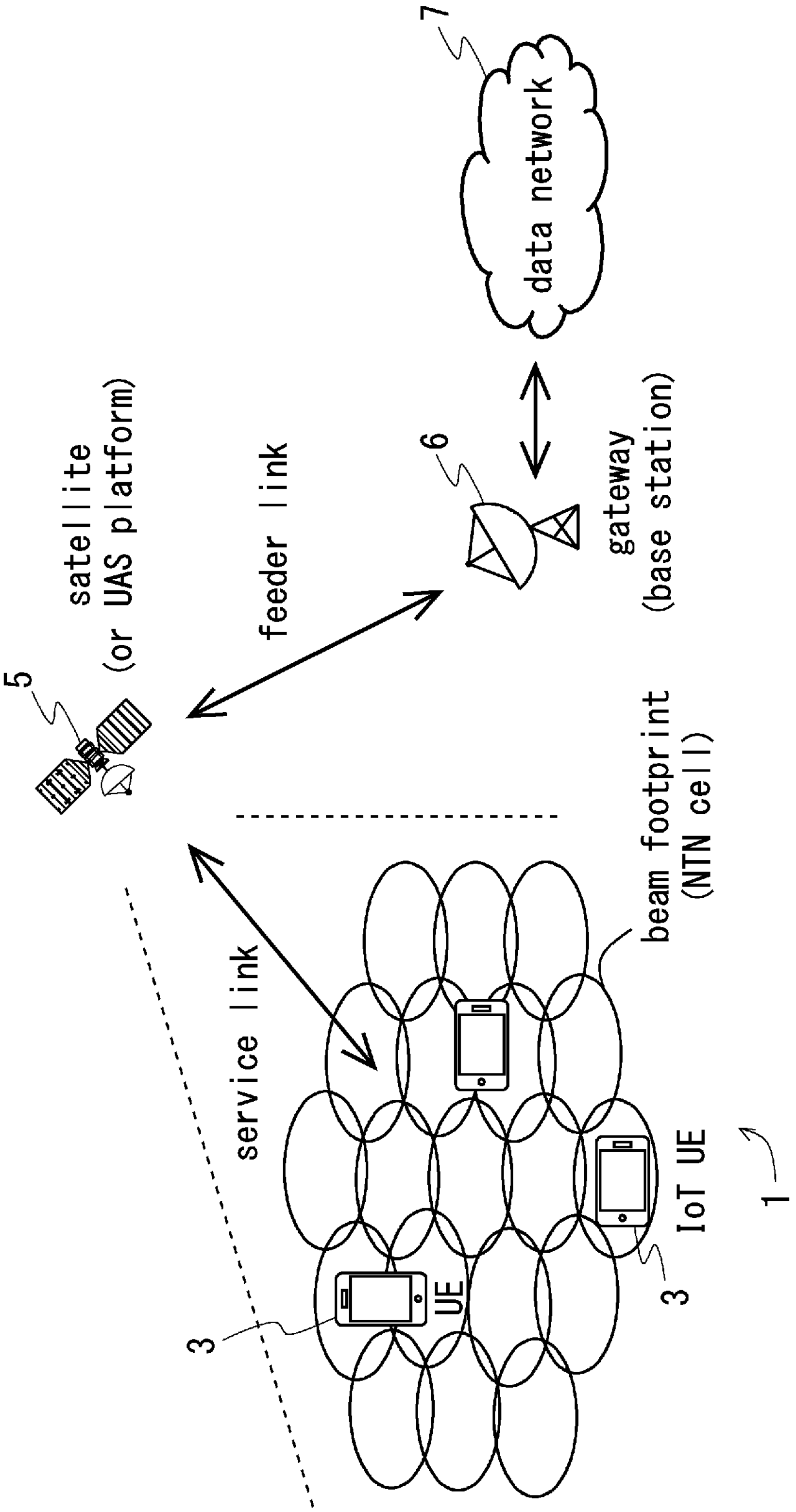
FIG. 1 illustrates schematically a mobile (cellular or wireless) telecommunication system to which embodiments of the disclosure may be applied.

FIG. 1 illustrates schematically a mobile (cellular or wireless) telecommunication system 1 to which embodiments of the disclosure may be applied.

In this system 1, users of mobile devices 3 (UEs) can communicate with each other and other users via access network nodes respective satellites 5 and/or base stations 6 and a data network 7 using an appropriate 3GPP radio access technology (RAT), for example, an E-UTRA (4G) and/or NR (5G) RAT. In case of an E-UTRA RAT, the base station 6 may be referred to as an 'eNB' or 'ng-eNB' and in case of an NR RAT, the base station 6 may be referred to as a 'gNB'. The UEs 3 may comprise NB-IoT or MTC UEs or they may include appropriate NB-IoT or MTC functionality. As those skilled in the art will appreciate, whilst three UEs 3, one satellite 5, and one base station 6 are shown in FIG. 1 for illustration purposes, the system, when implemented, will typically include other satellites/UAS platforms, base stations/RAN nodes, and mobile devices (UEs).

It will be appreciated that a number of base stations 6 form a (radio) access network or (R)AN, and a number of NTN nodes 5 (satellites and/or UAS platforms) form a Non-Terrestrial Network (NTN). Each NTN node 5 is connected to an appropriate gateway (in this case co-located with a base station 6) using a so-called feeder link and connected to respective UEs 3 via corresponding service links. Thus, when served by an NTN node 5, a mobile device 3 communicates data to and from a base station 6 via the NTN node 5, using an appropriate service link (between the mobile device 3 and the NTN node 5) and a feeder link (between the NTN node 5 and the gateway/base station 6). In other words, the NTN forms part of the (R)AN, although it may also provide satellite communication services independently of E-UTRA and/or 5G communication services.

Although not shown in FIG. 1, neighbouring base stations 6 are connected to each other via an appropriate base station to base station interface (such as the so-called 'X2' interface, 'Xn' interface, and/or the like). The base stations 6 are also connected to the data network nodes via an appropriate interface (such as the so-called 'S1', 'NG-C', 'NG-U' interface, and/or the like).

The data (or core) network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). Typically, the data network 7 will include user plane entities and control plane entities. The so-called Mobility Management Entity (MME) in 4G, or the Access and Mobility Management Function (AMF) in 5G, is responsible for handling connection and mobility management tasks for the mobile devices 3. The data network 7 is also coupled to other data networks such as the Internet or similar Internet Protocol (IP) based networks (not shown in FIG. 1).

Each NTN node 5 controls a number of directional beams via which associated NTN cells may be provided. Specifically, each beam has an associated footprint on the surface of the Earth which corresponds to an NTN cell. Each NTN cell (beam) has an associated Physical Cell Identity (PCI) and/or beam identity. The beam footprints may be moving as the NTN node 5 is travelling along its orbit. Alternatively, the beam footprint may be earth fixed, in which case an appropriate beam pointing mechanism (mechanical or electronic steering) may be used to compensate for the movement of the NTN node 5.

It will be appreciated that the UE 3 may be configured to perform only intermittent, delay-tolerant small packet transmissions when operating in IoT-NTN mode (or eMTC mode). Accordingly, the transmission session is usually relatively short, and the data packets can tolerate certain delay. However, even with these assumptions, even a stationary IoT/eMTC UE may experience RLF (or unnecessary handover) if it is in RRC-connected mode, or it may experience cell reselection if it is in RRC-idle mode, due to its current NTN cell no longer serving the area where the UE 3 is located. However, such RLFs/handovers/cell reselections are predictable from the UE's point of view based on e.g. ephemeris information and/or other broadcasted assistance information (timing information of serving cell stopping serving the area).

Beneficially, the nodes of this system 1 are configured to avoid (or at least reduce) radio link failures and handovers during small data transmissions when the UE 3 is served by an NTN cell. In particular, the following description may be applicable to data transmissions performed via a cell (which may be an NTN cell) in Radio Resource Control (RRC) idle mode or in RRC connected mode. This cell is referred to as the UE's current cell in the following.

In a first option, the UE 3 may be configured to delay data transmission and/or perform early cell reselection to another cell before starting the (delayed) data transmission. Specifically, upon (uplink) data arrival, but before requesting RRC connection and starting data transmission in its current cell, the UE 3 may decide to delay data transmission if the predicted/estimated timing of an upcoming cell selection is earlier than the estimated completion of the data transmission. The UE 3 may also take into account a number of other conditions, for example, QoS of the data (e.g. packet delay budget), data volume, etc. In particular, the UE 3 may decide to delay the data transmission when the associated packet delay budget is relatively long and the data volume is relatively small. The details may be left to UE implementation and/or may be configured (e.g. explicitly allowed) by the network.

In a second option, the UE 3 may be configured to perform early cell reselection to a suitable cell, upon (uplink) data arrival but before starting data transmission. For example, early cell reselection may be performed when it is determined that the current/camping cell will stop service very soon (e.g. remaining service time is within an associated threshold) and the new cell is already available (e.g. signal quality of the new cell is above an associated threshold). Alternatively, early cell reselection may be performed when it is determined that the current (camping) cell is moving away and the new cell is moving towards the UE 3. The UE 3 may be configured to use an appropriate offset for triggering cell reselection to a suitable neighbour cell prior to initiating the data transmission.

Effectively, in the first and second option the UE 3 determines, based on appropriate parameters, whether to initiate data transmission in its current cell or in a different cell (after performing normal cell reselection/early cell reselection to that cell).

In a third option, the UE 3 may be configured to employ a simplified RLF or handover procedure. In this case, the UE 3 may apply a different trigger (e.g. an NTN cell/NT-IoT specific trigger) instead of or in addition to the RLF trigger configured for conventional cells (or conventional UEs). For example, the UE 3 may be configured to apply one or both of the following triggers:

- RLF failure is triggered at a specific time configured by the network;
- RLF failure is triggered when the distance between the UE's location relative to the current cell's location is more than an associated threshold and/or the UE's location to a neighbour cell's reference location is less than an associated threshold.

In addition to the above described time and or location-based conditions, additional conditions can be configured/specified if appropriate. For example, the UE 3 may consider whether the data volume is more than a certain threshold or the (estimated) time required for completing its data transmission is more than an associated threshold. In this case, the UE 3 may be allowed to trigger RLF only if both data volume/time for completing its data transmission condition and the time/location-based condition are fulfilled.

It may also be possible to leave additional trigger conditions to UE implementation but with some limitations, e.g. not more than 3 RLFs within a certain time window.

In other words, based on the applicable RLF configuration and trigger conditions, the UE 3 may be configured to declare RLF earlier than it otherwise would, and inform the network about the imminent RLF so that the network (base station 6) can take appropriate action (e.g. find a suitable new cell for the UE 3). Accordingly, the UE 3 suspends transmitting data in the current cell when it can be determined that the transmission is likely to result in a radio link failure. In this case, the UE 3 can resume data transmission in a new cell (following RRC re-establishment).

In a fourth option, the UE 3 may be configured to switch to device-to-device (D2D) mode (such as proximity-based services (ProSe) mode), if supported and feasible, and try to establish D2D/relay communication with another UE 3 that is still in coverage. This option may be applicable when the UE 3 determines that it is about to suffer RLF (or when the UE 3 is out of coverage) but it has ongoing (unfinished) data transmission. In other words, the UE 3 determines whether to initiate data transmission in its current cell (via the base station) or via a suitable relaying device or UE (which may or may not be served by the same cell/base station). Accordingly, the UE 3 does not need to perform handover/cell reselection (at least for the current data transmission).

It will be appreciated that any one or more of the above options may be combined, depending on the use case and applicable system configuration.

User Equipment (UE)

Figure 2:
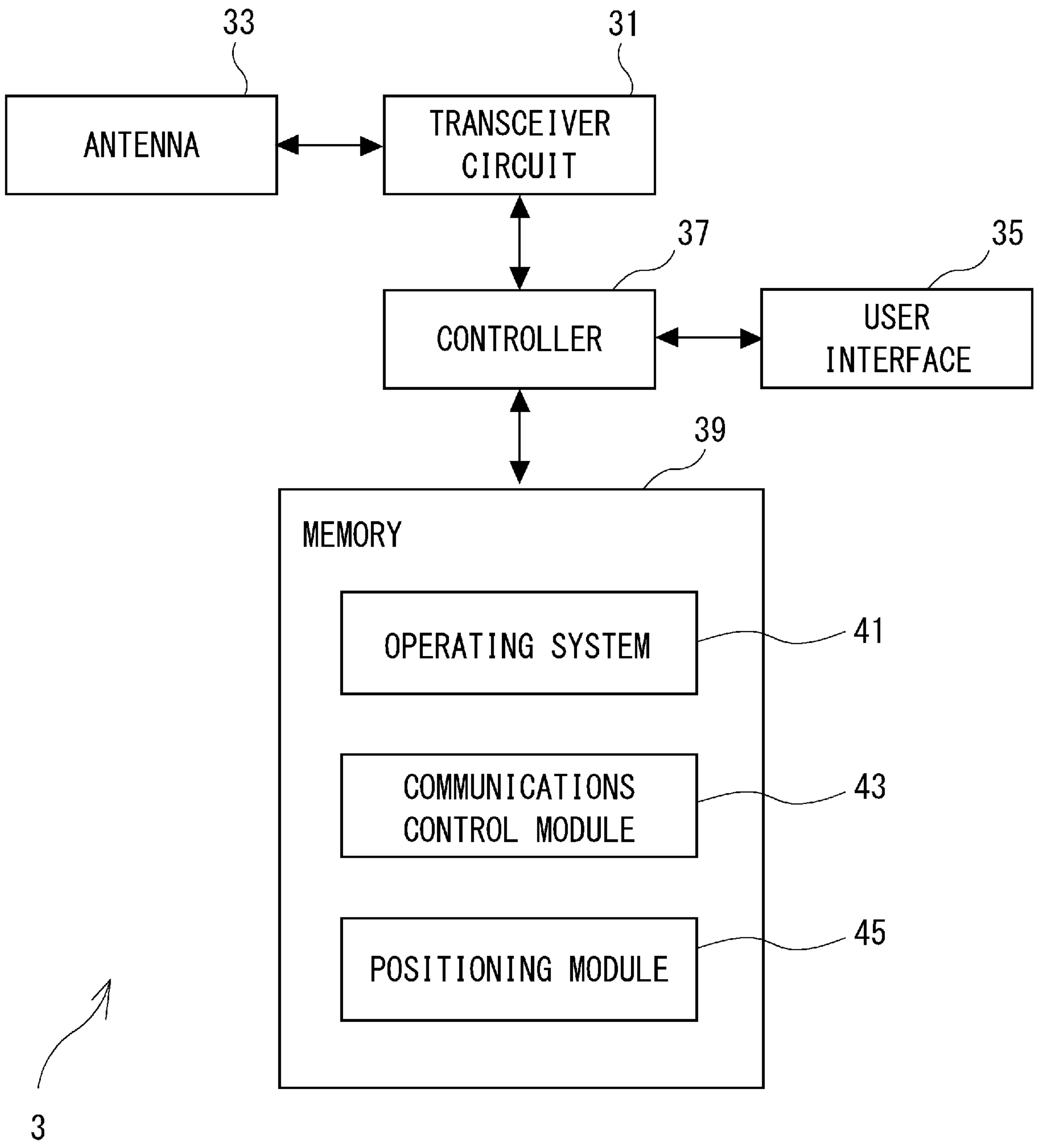
FIG. 2 is a schematic block diagram of a mobile device forming part of the system shown in FIG. 1.

FIG. 2 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 2, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, a communications control module 43, and a positioning module 45 (which is optional in some UEs).

The communications control module 43 is responsible for handling (generating/sending/receiving) signalling messages and uplink/downlink data packets between the UE 3 and other nodes, including NTN nodes 5, (R)AN nodes 6, and core network nodes. The signalling may comprise control signalling related to configuring data transmission timing and RLF operation, and associated parameters. When in D2D mode, the communications control module 43 controls direct communication with other UEs. When the UE 3 is configured to operate in eMTC/IoT/NB-IoT/IoT-NTN mode, the operation of the communications control module 43 is adapted accordingly.

If present, the positioning module 45 is responsible for determining the position of the UE 3, for example based on Global Navigation Satellite System (GNSS) signals.

NTN Node (Satellite/UAS Platform)

Figure 3:
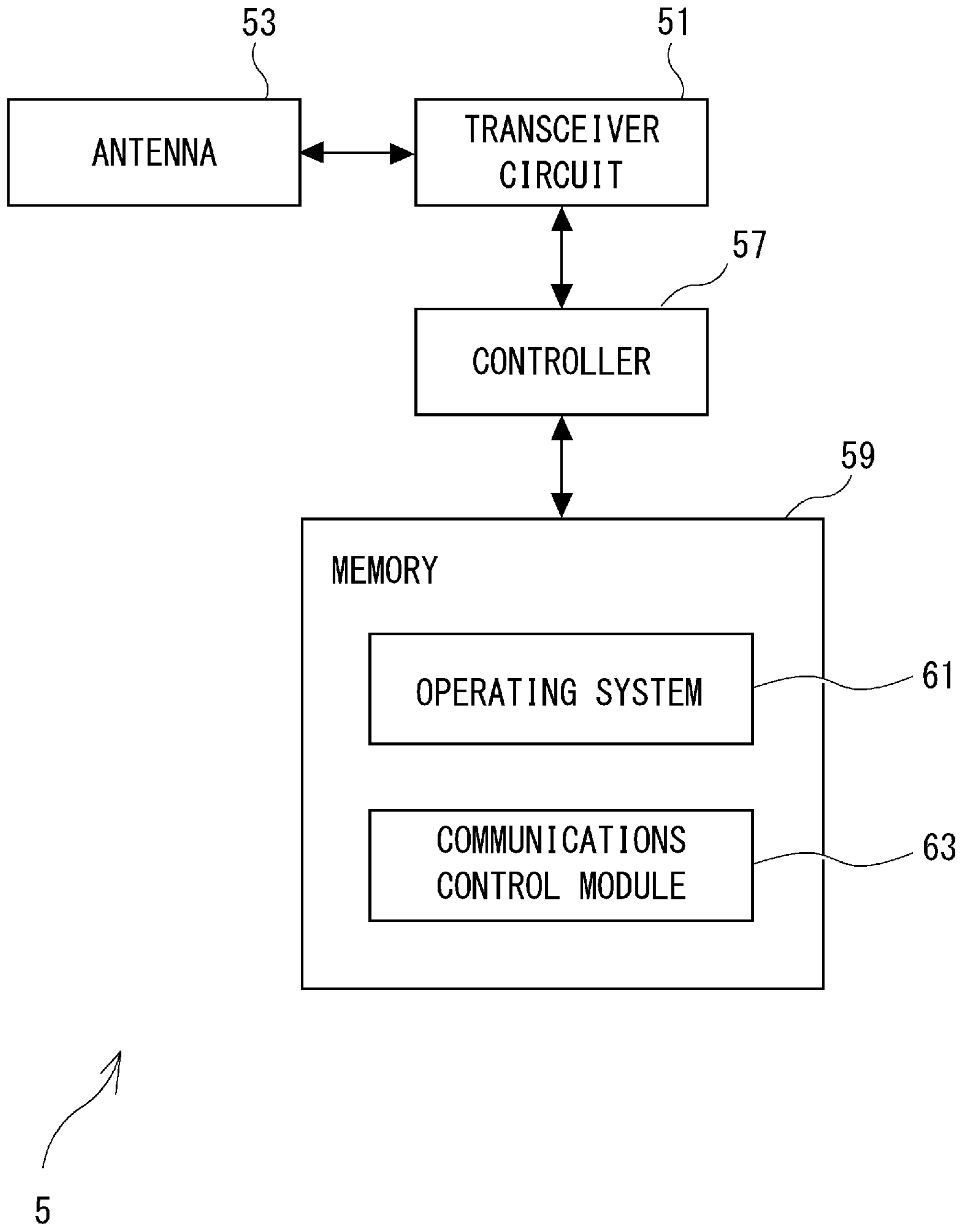
FIG. 3 is a schematic block diagram of an NTN node (e.g. satellite/UAS platform) forming part of the system shown in FIG. 1.

FIG. 3 is a block diagram illustrating the main components of the NTN node 5 (a satellite or a UAS platform) shown in FIG. 1. As shown, the NTN node 5 includes a transceiver circuit 51 which is operable to transmit signals to and to receive signals from connected UE(s) 3 via one or more antenna 53 and to transmit signals to and to receive signals from other network nodes such as gateways and base stations (either directly or indirectly). A controller 57 controls the operation of the NTN node 5 in accordance with software stored in a memory 59. The software may be pre-installed in the memory 59 and/or may be downloaded via the telecommunication network 1 or from a removable data storage device (RMD), for example. The software includes, among other things, an operating system 61, and a communications control module 63.

The communications control module 63 is responsible for handling (generating/sending/receiving) signalling between the NTN node 5 and other nodes, such as the UE 3, base stations 6, gateways, and core network nodes (via the base stations/gateways). The signalling may comprise control signalling related to configuring data transmission timing and RLF operation for the UE 3, and associated parameters.

Base Station/Gateway (Access Network Node)

Figure 4:
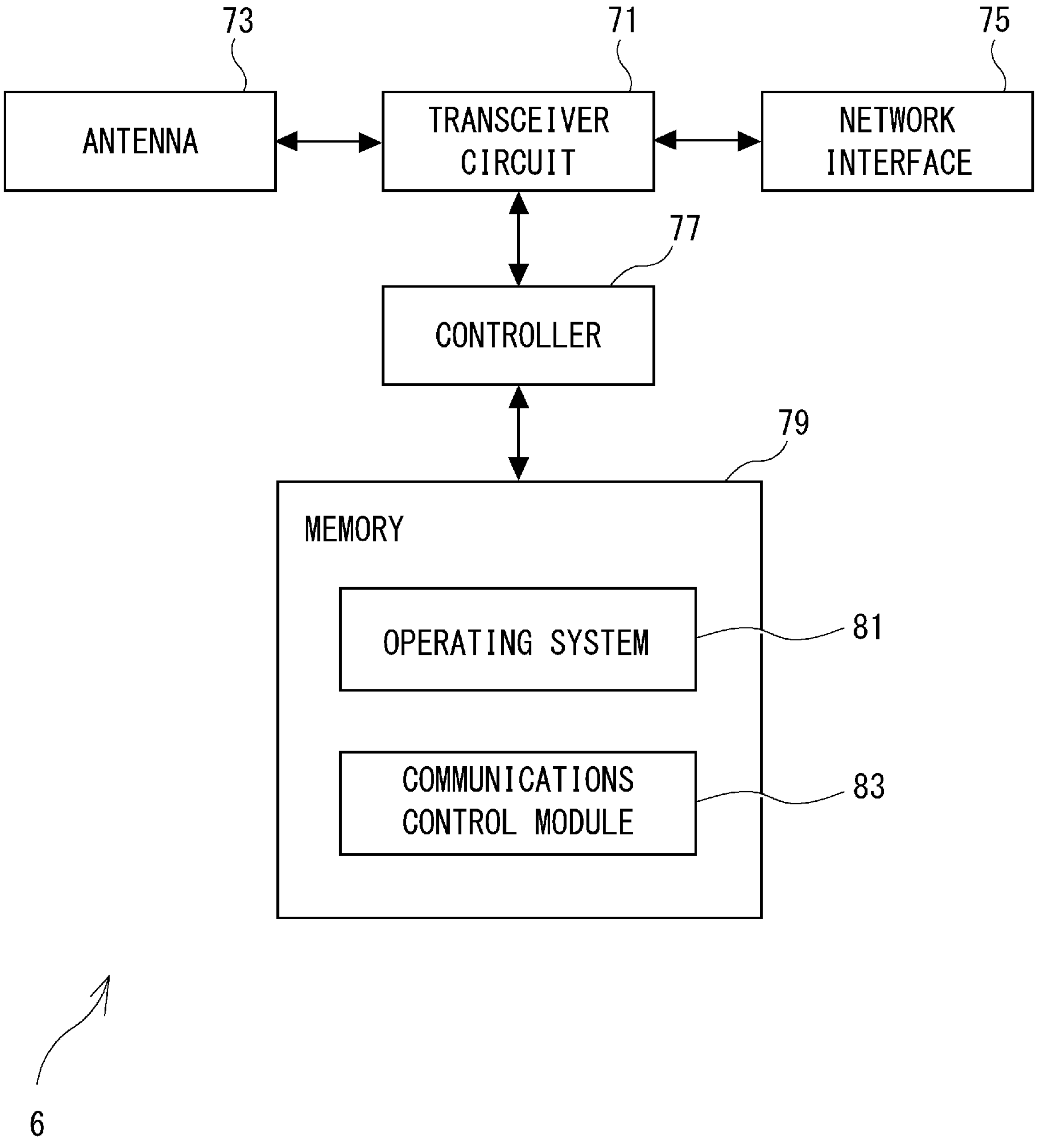
FIG. 4 is a schematic block diagram of an access network node (e.g. base station) forming part of the system shown in FIG. 1.

FIG. 4 is a block diagram illustrating the main components of the gateway 6 shown in FIG. 1 (a base station (gNB) or a similar access network node). As shown, the gateway/gNB 6 includes a transceiver circuit 71 which is operable to transmit signals to and to receive signals from connected UE(s) 3 via one or more antenna 73 and to transmit signals to and to receive signals from other network nodes (either directly or indirectly) via a network interface 75. Signals may be transmitted to and received from the UE(s) 3 either directly and/or via the NTN node 5, as appropriate. The network interface 75 typically includes an appropriate base station—base station interface (such as X2/Xn) and an appropriate base station—core network interface (such as S1/NG-C/NG-U). A controller 77 controls the operation of the base station 6 in accordance with software stored in a memory 79. The software may be pre-installed in the memory 79 and/or may be downloaded via the telecommunication network 1 or from a removable data storage device (RMD), for example. The software includes, among other things, an operating system 81, and a communications control module 83.

The communications control module 83 is responsible for handling (generating/sending/receiving) signalling between the base station 6 and other nodes, such as the UE 3, NTN nodes 5, and core network nodes. The signalling may comprise control signalling related to configuring data transmission timing and RLF operation for the UE 3, and associated parameters.

DETAILED DESCRIPTION

The following is a description of some exemplary procedures (Solutions 1 to 4) performed by the nodes of the system shown in FIG. 1. At least in Solutions 1 and 2, the UE 3 is assumed to be in RRC idle mode in an NTN cell (current cell). Solutions 3 and 4 may be applicable to UEs 3 in RRC connected mode in an NTN cell. The steps that may be performed by the UE 3 will be described with reference to the flowcharts shown in FIGS. 5-7.

In the following examples, the UE (including eMTC/IoT/NB-IoT UEs) can communicate via NTN cells and it may also be able to obtain associated ephemeris data from the satellites. The tracking areas are earth-fixed even though the NTN cells may change over time due to the movement of the satellites 5 providing these cells.

Solution 1

Figure 5:
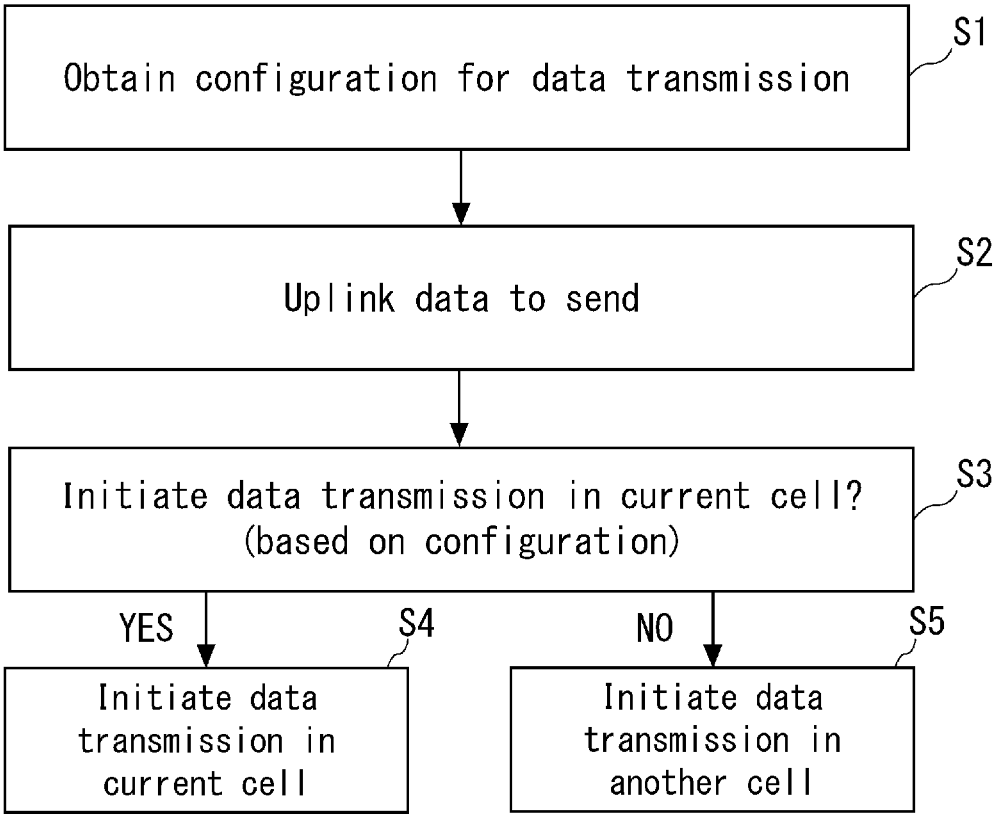
FIG. 5 illustrates schematically some exemplary ways in which the present disclosure may be implemented by the UE shown in FIG. 1.

The UE 3 may be configured to delay data transmission and/or perform early cell reselection to another cell before starting data transmission, as generally illustrated in FIG. 5.

In more detail, the UE 3 obtains (step S1) appropriate configuration for its data transmissions in an NTN cell (or for a group of NTN cells). The UE 3 may receive the configuration from the base station 6, for example, via system information or dedicated signalling (e.g. RRC configuration). The UE 3 may obtain ephemeris data for its current cell (an NTN cell served by the satellite 5) and neighbour cells from which it can determine how long it is likely to remain in coverage of that cell and a neighbour cell will be available.

When the UE 3 detects that there is uplink data to send (step S2) it proceeds to perform a determination (step S3) before starting data transmission. Specifically, in step S3, the UE 3 determines whether it should initiate data transmission in the current cell or delay the data transmission until a new cell is selected. The UE's 3 determination is based on the configuration obtained in step S1, also taking into account the coverage available in the current cell (e.g. a prediction of the time left until cell reselection will be necessary due to movement of the satellite 5). The UE 3 may also take into account one or more parameters associated with the data to be transmitted, for example, an associated QoS, data volume, and/or the like. Although not shown in FIG. 5, the network (base station 6) may provide an appropriate indication (e.g. one bit or a flag included in the system information) whether delaying of uplink transmissions is allowed in that cell. The base station 6 may also specify (in system information/RRC, or as part of the configuration in step S1) what type of data or QoS can be delayed (if any). The base station 6 may also configure a maximum delay allowance (which may be given on a per QoS/per data type basis). In other words, delayed data transmission will be allowed only if the predicted timing of cell reselection and any other delay is estimated to be less than a certain value.

In one example, the UE 3 may be configured to delay the transmission when the following conditions are met:

1) QoS requirement/Packet Delay Budget (PDB) associated with the data: long;
2) predicted timing of cell selection: very soon (e.g. within an associated threshold);
3) data volume: small (e.g. smaller than an associated threshold).

If in step S3 the UE 3 determines that the imminent data transmission can be completed in the current cell (or that it is not allowed to delay transmission of this data), then it proceeds to step S4 and initiates data transmission in the current NTN cell. If the data transmission cannot be completed in the current cell, then the UE 3 will perform cell reselection to a new suitable cell and transmits any remaining data (or retransmits the data) in the newly selected cell.

Alternatively, if the UE 3 determines in step S3 that the data transmission cannot be completed (or it cannot be initiated) in the current cell, then it proceeds to step S5 and initiates data transmission in a different cell (after appropriate cell reselection).

In summary, the UE 3 is able to avoid unnecessary RLF/handover during a short data transmission session (e.g. data transmission by an NB-IoT or eMTC UE), by delaying initiation of the data transmission, if the UE 3 can predict that the current cell will stop service very soon (before the transmission can be completed).

Beneficially, the UE 3 can stay in RRC idle mode and buffer its (small) data transmission or delay requesting an RRC connection until after cell reselection. Accordingly, handover and associated signalling can be avoided or at least reduced.

Solution 2

FIG. 5 is also applicable to Solution 2. However, in this case, the configuration in step 1 includes parameters (e.g. an offset) causing the UE 3 to perform an early cell reselection to a suitable cell, upon data arrival but before starting data transmission.

For example, early cell reselection may be performed when it is determined (in step S3) that the UE's current cell is about to become unavailable (e.g. a remaining service time of the current cell is within an associated threshold) and a suitable new cell is already available (e.g. the signal quality of the new cell is above an associated threshold). Alternatively, early cell reselection may be performed based on direction information associated with the cells, for example, when it is determined that the current cell is moving away and the new cell is moving towards the UE 3.

Early cell reselection may be achieved using an appropriate signal offset that is specific to NTN cells and/or small data transmissions. The offset may be a value (a configured or a specified value) that is used in addition to conventional cell reselection parameters. For example, the UE 3 may be allowed to reselect to the best neighbour cell if the best neighbouring cell's signal is not worse than the signal of the current cell signal minus the offset. Early cell reselection may also be achieved using a time offset applied to the predicted upcoming cell reselection time.

Thus, if in step S3 the UE 3 determines (after applying the relevant parameters/offsets) that the data transmission can be completed in the current cell, then it proceeds to step S4 and initiates data transmission in the current cell. However, if the UE 3 determines in step S3 that the conditions for early cell reselection are met, then it proceeds to step S5 and initiates data transmission in a different cell (after appropriate cell reselection).

In summary, data transmission is initiated in the current cell or in a new cell (after early cell reselection) in dependence on the applicable configuration.

Solution 3

Figure 6:
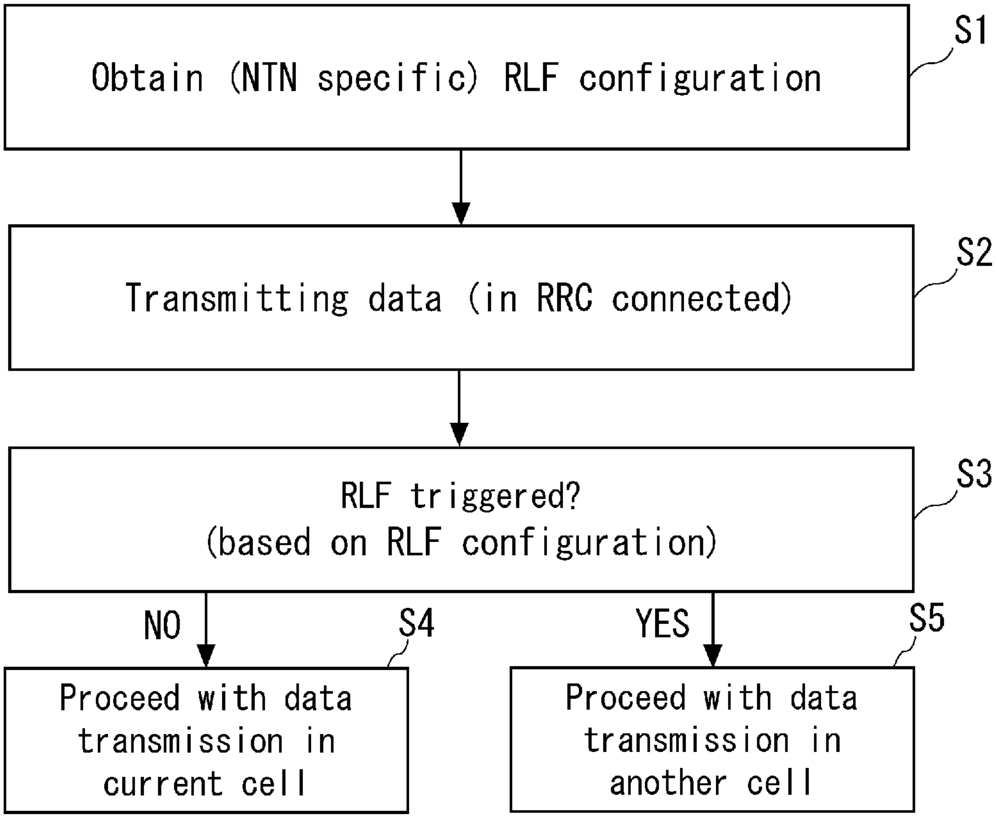
FIG. 6 illustrates schematically some exemplary ways in which the present disclosure may be implemented by the UE shown in FIG. 1.

FIG. 6 illustrates schematically an exemplary procedure performed by the UE 3. In this case, the UE 3 (which may be an NB-IoT UE) is configured to employ a simplified RLF procedure. Specifically, the UE 3 obtains (in step S1) and applies (in step S3) an appropriate NTN cell (or NB-IoT) specific RLF trigger instead of (or in addition to) the RLF trigger for conventional cells (or conventional UEs). It is assumed that a RLF may be followed by RRC connection re-establishment in a suitable cell. Thus, effectively, the RLF procedure of this example may be regarded as a handover procedure.

A number of different triggers (at least one trigger) may be used for declaring or predicting RLF, and some of these triggers may be combined with others. For example, the UE 3 may trigger RLF failure in a cell at a specific time configured by the network (which may be a time by which the network expects the UE 3 to have poor coverage or to be out of coverage of that cell). The UE 3 may also trigger RLF failure when the distance between the UE's location to the current cell's location is more than an associated threshold and/or the UE's location to a neighbour cell's reference location is less than an associated threshold. Such location-based trigger may be based on ephemeris data for the current and the target cell. In other words, the UE 3 may perform RRC-re-establishment in another cell due to RLF in the current cell, based on time and/or location-based triggers, while transmitting (or preparing for transmitting) uplink data. When a location-based trigger is activated, for example due to the UE 3 or its current cell moving, the UE 3 informs the network about the predicted RLF. If appropriate, the UE 3 may also indicate target cell candidates and provide any associated measurements with the RLF indication to help the network in its handover preparations (e.g. to suspend downlink transmission earlier and to prepare a suitable target cell, for example by sending an appropriate handover/redirection request).

It will also be appreciated that the UE 3 may consider in its decision (in step S3) whether the (remaining) data volume in its transmit buffer is more than a certain threshold, or the (estimated) time required for completing the transmission is more than an associated threshold. The UE 3 may be allowed to trigger RLF only if both the remaining data volume and the time for completing the transmission, and any time/location-based conditions are fulfilled. Other trigger conditions may be possible, depending on UE implementation. However, these conditions may need some limitations, e.g. a maximum number of RLFs within a predetermined time window.

If in step S3 the UE 3 determines (after applying the relevant RLF configuration/triggers) that the data transmission can be completed in the current cell without an RLF (step S3: 'NO'), then it proceeds to step S4 and proceeds with (continues) the data transmission in the current cell.

If based on the applicable RLF configuration and trigger conditions the UE 3 declares or expects to declare an RLF, before or during the data transmission, then the result of the determination in step S3 is 'YES' and the UE 3 proceeds to step S5. In this case, optionally, the UE 3 may indicate an RLF to the base station 6 before executing RRC reestablishment to a target cell, and the base station 6 can prepare for the upcoming RLF (e.g. by suspending downlink data transmission and prepare the target cell for upcoming RRC-reestablishment).

Beneficially, the above described RLF procedure allows the UE 3 to avoid data loss in the current cell when it can be determined that the transmission is likely to result in a radio link failure. It will be appreciated that Solution 3 may be particularly useful for NB-IoT type of UEs which do not support handover, as they can use the above described RLF procedure instead, with RRC-reestablishment in a new cell. Moreover, the above described RLF procedure may shorten the overall service interruption when switching between cells because in this case a predictable RLF can be followed by RRC-reestablishment in the new cell without unnecessary delay and data loss.

Solution 4

Figure 7:
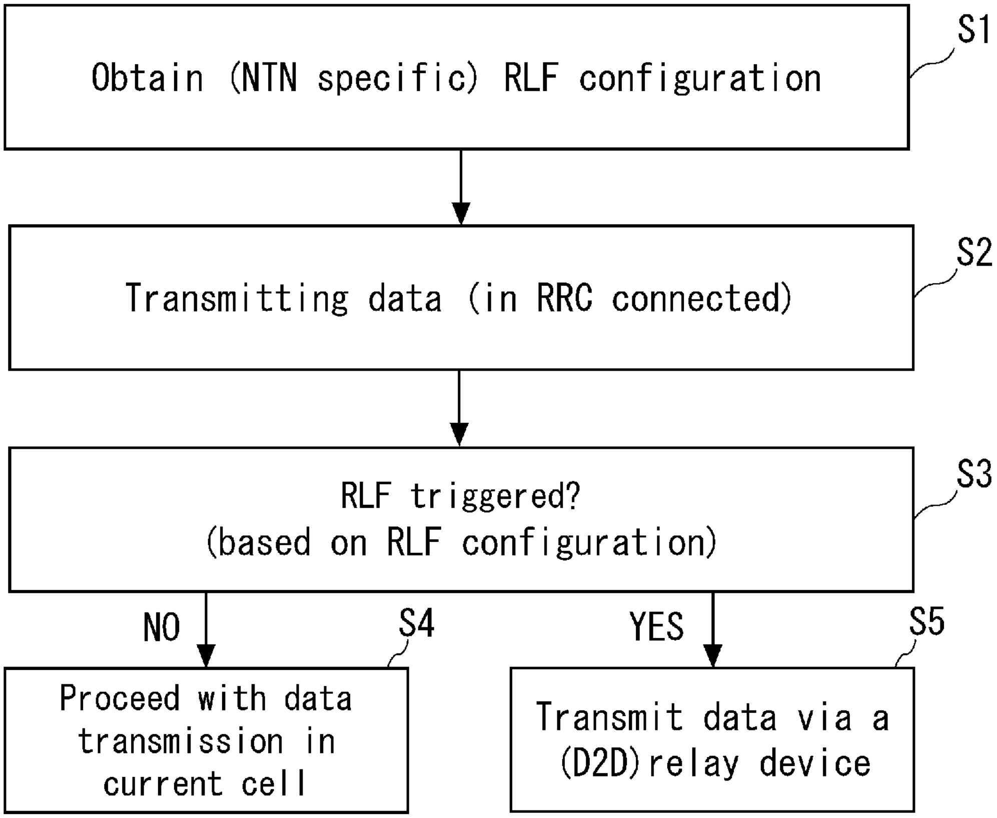
FIG. 7 illustrates schematically some exemplary ways in which the present disclosure may be implemented by the UE shown in FIG. 1.

FIG. 7 illustrates schematically an exemplary procedure performed by the UE 3 in determining whether to transmit data in its current cell or to switch to a device-to-device (D2D) mode.

This solution is similar to Solution 3 described above. Accordingly, steps S1 and S3 of this procedure are based on the corresponding steps of FIG. 6. Alternatively, they may be based on or combined with steps S1 and S3 of FIG. 5.

This procedure may be applicable when the UE 3 determines (in step S3) that it is about to suffer RLF (or when the UE 3 is already out of coverage) and it has data to send (including any ongoing/unfinished data transmission).

In step S5, depending on the result of step S3, the UE 3 switches to a D2D mode (such as proximity-based services (ProSe) mode or similar) and establishes a D2D/relay communication with another UE 3 that is still in coverage when the UE 3 declares RLF (or when it determines that the data transmission cannot be completed in the current cell in time). Thus, the UE 3 changes its communication mode instead of changing its serving cell. In other words, the UE 3 determines whether to initiate/continue data transmission in its current cell (via the base station 6) or via a suitable relaying device or UE relay (which may or may not be served by the same cell/base station).

Beneficially, the UE 3 does not need to perform handover/cell reselection (for the current data transmission) if it can complete the transmission via a relaying device/UE.

Modifications and Alternatives

Detailed embodiments have been described above. As those skilled in the art will appreciate, a number of modifications and alternatives can be made to the above embodiments whilst still benefiting from the disclosures embodied therein. By way of illustration only a number of these alternatives and modifications will now be described.

In the above embodiments, when the UE delays transmission it re-selects or it is handed over to a new cell. It will be appreciated that the new cell may have the same PCI as the UE's current serving cell (e.g. a satellite may re-use the same PCI to cover the same geographical area as the old cell). Alternatively, if data transmission is delayed long enough, the same satellite may cover the UE's position again in which case the old cell and the new cell may be the same.

When the UE delays data transmission, the network may also configure the UE to initiate the data transmission session in the new cell only after camping on that cell for a minimum of time (e.g. given in seconds). For example, the UE may employ a random backoff timer after cell reselection (e.g. a random value between 0 and a network-configured value) or a fixed delay (e.g. a specific, network-configured value) before initiating data transmission in the new cell. Beneficially, this approach allows avoiding a high initial access load in the new cell when several UEs switch to that cell due to a feeder/service link switch.

Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). The term base station may refer to any of the following nodes defined in NPL 4 and NPL 5:

- gNB: node providing NR user plane and control plane protocol terminations towards the UE, and connected via the NG interface to the 5G core network (5GC).
- ng-eNB: node providing Evolved Universal Terrestrial Radio Access (E-UTRA) user plane and control plane protocol terminations towards the UE, and connected via the NG interface to the 5GC.
- En-gNB: node providing NR user plane and control plane protocol terminations towards the UE, and acting as Secondary Node in E-UTRA-NR Dual Connectivity (EN-DC).
- NG-RAN node: either a gNB or an ng-eNB.

It will be appreciated that the above embodiments may be applied to both 5G New Radio and LTE systems (E-UTRAN). A base station (gateway) that supports E-UTRA/4G protocols may be referred to as an 'eNB' and a base station that supports NextGeneration/5G protocols may be referred to as a 'gNBs'. It will be appreciated that some base stations may be configured to support both 4G and 5G protocols, and/or any other 3GPP or non-3GPP communication protocols.

The communication protocol used by the UE and the relay (in step S5 of FIG. 7) is not restricted to any communication protocol specified by 3GPP (such as 4G or 5G). For example, the UE and the relay may use a communication protocol specified in one of the 802.11 set of standards by the Institute of Electrical and Electronics Engineers (IEEE), or a communication protocol specified by the Bluetooth Special Interest Group (SIG).

TABLE 1 types of satellites and UAS platforms

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

Figure 8:
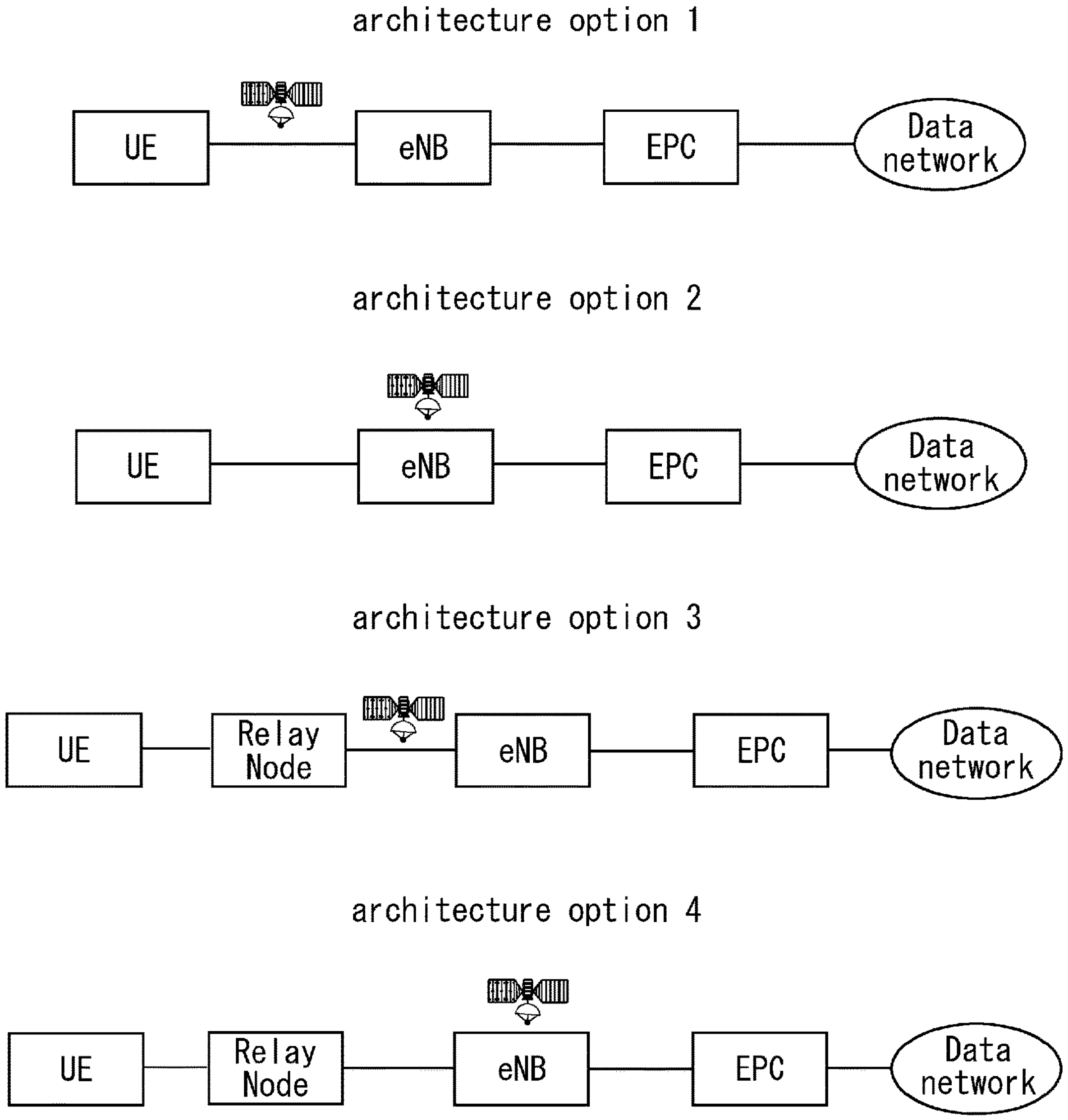
FIG. 8 illustrates schematically some exemplary architecture options for the provision of NTN features in the system shown in FIG. 1.

It will be appreciated that there are various architecture options to implement NTN in a 4G system, some of which are illustrated schematically in FIG. 8. The first option shown is an NTN featuring an access network serving UEs and based on a satellite/aerial with bent pipe payload and eNB on the ground (satellite hub or gateway level). The second option is an NTN featuring an access network serving UEs and based on a satellite/aerial with eNB on board. The third option is an NTN featuring an access network serving Relay Nodes and based on a satellite/aerial with bent pipe payload. The fourth option is an NTN featuring an access network serving Relay Nodes and based on a satellite/aerial with eNB. It will be appreciated that other architecture options may also be used, for example, a combination of two or more of the above described options. Alternatively, the relay node may comprise a satellite/UAS. It will be appreciated that similar architecture options may be used in a 5G/NR system as well, but with gNB instead of eNB, and NGC instead of EPC.

In the above description, the UE, the NTN node (satellite/UAS platform), and the access network node (base station) are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the NTN node, and the access network node (base station) as a signal over a computer network, or on a recording medium. Further, the functionality performed by part or all of this software may be performed using one or more dedicated hardware circuits. However, the use of software modules is preferred as it facilitates the updating of the UE, the NTN node, and the access network node (base station) in order to update their functionalities.

The above embodiments are also applicable to 'non-mobile' or generally stationary user equipment.

The at least one parameter may comprise one or more of: a time parameter (e.g. remaining time in current cell and/or time until cell reselection can be completed), a QoS parameter associated with said data; a data volume; a parameter relating to availability of a new cell; a parameter relating to a movement of the new cell (e.g. direction); an offset (e.g. a signal offset or a time offset for cell reselection); a parameter from the network indicating that the UE is allowed to delay data transmissions; and a parameter from the network indicating that the UE is allowed to perform early cell reselection.

The method performed by the UE may further comprise determining whether to perform cell reselection based on at least one of: a time parameter relating to said cell reselection; and a time parameter relating to the data transmission.

The method performed by the UE may further comprise initiating the data transmission after cell reselection when an associated packet delay budget is relatively long.

The method performed by the UE may further comprise performing said cell reselection (e.g. an early cell reselection) to a new cell, based on an offset, before initiating said data transmission in the new cell.

The method performed by the UE may further comprise performing a cell reselection to a new cell when it is determined that a remaining service time of a current cell is less than an associated threshold and the new cell is available (e.g. a signal quality of the new cell is above an associated threshold).

The method performed by the UE may further comprise performing a cell reselection to a new cell based on at least one of: information identifying a direction of a current cell of the UE (e.g. moving away from the UE); and information identifying a direction of the new cell (e.g. moving towards the UE).

The method performed by the UE may further comprise applying, after cell reselection to a new cell, a random backoff timer or a predetermined delay timer before initiating said data transmission.

The at least one parameter may identify a specific time, and the method may comprise the UE declaring RLF failure for the current cell at that specific time.

The at least one parameter may identify at least one threshold, and the method may comprise the UE declaring RLF failure for the current cell when: i) a distance between a current location of the UE relative to a location of the current cell is more than a first threshold; and/or ii) a distance between the current location of the UE relative to the new cell is less than a second threshold.

The at least one parameter may identify a data volume threshold, and the method may comprise the UE declaring RLF failure with respect to the data transmission in the current cell when a data volume associated with the data transmission is more than said data volume threshold.

The at least one parameter may identify a time threshold, and the method may comprise the UE declaring RLF failure with respect to the data transmission in the current cell when a time required for completing said data transmission is more than said time threshold.

The relay device may comprise a D2D/ProSe UE. The UE may be configured to operate as an Internet-of-Things (IoT) device.

Various other modifications will be apparent to those skilled in the art and will not be described in further detail here.

The whole or part of the exemplary embodiments disclosed above can be described as, but not limited to, the following supplementary notes.

Supplementary Note 1

A method performed by a user equipment (UE) configured to communicate via a non-terrestrial network, the method comprising:

determining whether to delay or suspend a data transmission, based on at least one parameter for indicating whether the data transmission will be completed before an event preventing the data transmission; and initiating or resuming the data transmission, before or after the event based on the determining.

Supplementary Note 2

The method according to Supplementary Note 1, wherein the event includes cell reselection to a new cell, the determining is performed by determining whether to delay the data transmission to perform the cell reselection to the new cell, based on the at least one parameter for indicating whether the data transmission will be completed before the cell reselection; and the initiating is performed by initiating the data transmission, before or after the cell reselection, based on the determining.

Supplementary Note 3

The method according to Supplementary Note 2, wherein the determining is performed based on at least one of:

a time parameter relating to the cell reselection; and a time parameter relating to the data transmission.

Supplementary Note 4

The method according to Supplementary Note 2 or 3, wherein the at least one parameter includes one or more of:

a time parameter;

a QoS parameter associated with data for the data transmission;

a data volume;

a parameter relating to availability of the new cell;

a parameter relating to a movement of the new cell;

an offset;

a parameter from the network indicating that the UE is allowed to delay data transmission; and a parameter from the network indicating that the UE is allowed to perform early cell reselection.

Supplementary Note 5

The method according to any one of Supplementary Notes 2 to 4, further comprising:

performing the cell reselection before the initiating the data transmission in a case where a packet delay budget with data for the data transmission is relatively long.

Supplementary Note 6

The method according to any one of Supplementary Notes 2 to 4, further comprising:

performing the cell reselection before the initiating the data transmission in a case where an offset indicates to cause the UE to perform an early cell reselection.

Supplementary Note 7

The method according to any one of Supplementary Notes 2 to 4, further comprising:

performing the cell reselection before the initiating the data transmission in a case where it is determined that a remaining service time of a current cell is less than a threshold and the new cell is available.

Supplementary Note 8

The method according to any one of Supplementary Notes 2 to 4, further comprising:

performing the cell reselection before the initiating the data transmission based on at least one of:

information identifying a direction of a current cell of the UE; and information identifying a direction of the new cell.

Supplementary Note 9

The method according to any one of Supplementary Notes 2 to 8, further comprising:

applying, after the cell reselection, a random backoff timer or a predetermined delay timer before the initiating the data transmission.

Supplementary Note 10

The method according to Supplementary Note 1, wherein the event includes a radio link failure (RLF);

the determining is performed by determining that the RLF is about to occur with respect to the data transmission in a current cell of the UE, based on the at least one parameter for indicating whether the data transmission will be completed before the RLF; and the initiating includes proceeding with the data transmission in a new path.

Supplementary Note 11

The method according to Supplementary Note 10, wherein the proceeding with the data transmission in the new path includes proceeding with the data transmission in a new cell, after declaring the RLF for the current cell.

Supplementary Note 12

The method according to Supplementary Note 10, wherein the proceeding with the data transmission in the new path includes proceeding with the data transmission via a relay device based on the determining.

Supplementary Note 13

The method according to any one of Supplementary Notes 10 to 12, wherein the at least one parameter identifies a specific time, and the method comprises declaring the RLF for the current cell at the specific time.

Supplementary Note 14

The method according to any one of Supplementary Notes 10 to 13, wherein the at least one parameter identifies at least one threshold, and the method comprises declaring the RLF for the current cell in a case where:

i) a distance between a current location of the UE relative to a location of the current cell is more than a first threshold; and/or ii) a distance between the current location of the UE relative to the new cell is less than a second threshold.

Supplementary Note 15

The method according to any one of Supplementary Notes 10 to 14, wherein the at least one parameter identifies a data volume threshold, and the method comprises declaring the RLF with respect to the data transmission in the current cell in a case where a data volume associated with the data transmission is more than the data volume threshold.

Supplementary Note 16

The method according to any one of Supplementary Notes 10 to 15, wherein the at least one parameter identifies a time threshold, and the method comprises declaring the RLF with respect to the data transmission in the current cell in a case where a time required for completing the data transmission is more than the time threshold.

Supplementary Note 17

A method performed by a network node configured to communicate with a user equipment (UE) via a non-terrestrial network, the method comprising:

providing at least one parameter for indicating whether data transmission will be completed before an event preventing the data transmission to the UE, for determining whether to delay or suspend the data transmission and to initiate or resume the data transmission before or after the event.

Supplementary Note 18

A user equipment (UE) configured to communicate via a non-terrestrial network, the UE comprising:

means for determining whether to delay or suspend a data transmission, based on at least one parameter for indicating whether the data transmission will be completed before an event preventing the data transmission; and means for initiating or resuming the data transmission, before or after the event, based on the determining.

Supplementary Note 19

A network node configured to communicate with a user equipment (UE) via a non-terrestrial network, the network node comprising:

means for providing at least one parameter for indicating whether data transmission will be completed before an event preventing the data transmission to the UE, for determining whether to delay or suspend the data transmission and to initiate or resume the data transmission before or after the event.

This application is based upon and Supplementary Notes the benefit of priority from Great Britain Patent Application No. 2110569.7, filed on Jul. 22, 2021, the disclosure of which is incorporated herein in its entirety by reference.

REFERENCE SIGNS LIST

1 Mobile telecommunication system
3 Mobile devices
5 Satellites
6 Base stations
7 Data network
31 Transceiver circuit
33 Antenna
35 User interface
37 Controller
39 Memory
41 Operating system
43 Communications control module
45 Positioning module
51 Transceiver circuit
53 Antenna
57 Controller
59 Memory
61 Operating system
63 Communications control module
71 Transceiver circuit
73 Antenna
75 Network interface
77 Controller
79 Memory
81 Operating system
83 Communications control module

What is claimed is:

1. A method performed by a user equipment (UE) configured to communicate via a non-terrestrial network, the method comprising:

determining whether to delay or suspend a data transmission, based on at least one parameter for indicating whether the data transmission will be completed before a current serving cell of the UE will stop a service; and initiating or resuming the data transmission, before or after the current serving cell will stop the service based on the determining, wherein the determining is performed by determining whether to delay the data transmission to perform cell reselection to a new cell, based on the at least one parameter for indicating whether the data transmission will be completed before the current serving cell will stop the service, wherein the initiating is performed by initiating the data transmission, before or after the cell reselection, based on the determining, and wherein the method further comprises applying, after the cell reselection, a random backoff timer or a predetermined delay timer before the initiating the data transmission.

2. The method according to claim 1, wherein the determining is performed based on at least one of:

a time parameter relating to the cell reselection; and a time parameter relating to the data transmission.

3. The method according to claim 1, wherein the at least one parameter includes one or more of:

a time parameter, a Quality of Service (QoS) parameter associated with data for the data transmission;

a data volume;

a parameter relating to availability of the new cell;

a parameter relating to a movement of the new cell;

an offset;

a parameter from the non-terrestrial network indicating that the UE is allowed to delay the data transmission; and a parameter from the non-terrestrial network indicating that the UE is allowed to perform early cell reselection.

4. The method according to claim 1, further comprising:

performing the cell reselection before the initiating the data transmission in a case where a packet delay budget with data for the data transmission is longer than a threshold.

5. The method according claim 1, further comprising:

performing the cell reselection before the initiating the data transmission in a case where an offset indicates to cause the UE to perform an early cell reselection.

6. The method according claim 1, further comprising:

performing the cell reselection before the initiating the data transmission in a case where it is determined that a remaining service time of a current cell is less than a threshold and the new cell is available.

7. The method according to claim 1, further comprising:

performing the cell reselection before the initiating the data transmission based on at least one of:

information identifying a direction of a current cell of the UE; and information identifying a direction of the new cell.

8. The method according to claim 1, wherein the determining is performed by determining that a radio link failure (RLF) is about to occur with respect to the data transmission in the current serving cell, based on the at least one parameter for indicating whether the data transmission will be completed before the RLF; and the initiating includes proceeding with the data transmission in a new path.

9. The method according to claim 8, wherein the proceeding with the data transmission in the new path includes proceeding with the data transmission in the new cell, after declaring the RLF for a current cell.

10. The method according to claim 8, wherein the proceeding with the data transmission in the new path includes proceeding with the data transmission via a relay device based on the determining.

11. The method according to claim 8, wherein the at least one parameter identifies a specific time, and the method comprises declaring the RLF for the current serving cell at the specific time.

12. The method according to claim 8, wherein the at least one parameter identifies at least one threshold, and the method comprises declaring the RLF for the current serving cell in a case where:

i) a distance between a current location of the UE relative to a location of a current cell is more than a first threshold; and/or ii) a distance between the current location of the UE relative to the new cell is less than a second threshold.

13. The method according to claim 8, wherein the at least one parameter identifies a data volume threshold, and the method comprises declaring the RLF with respect to the data transmission in a current cell in a case where a data volume associated with the data transmission is more than the data volume threshold.

14. The method according to claim 8, wherein the at least one parameter identifies a time threshold, and the method comprises declaring the RLF with respect to the data transmission in the current serving cell in a case where a time required for completing the data transmission is more than the time threshold.

15. A method performed by a network node configured to communicate with a user equipment (UE) via a non-terrestrial network, the method comprising:

transmitting, to the UE, at least one parameter for indicating whether data transmission will be completed before a current serving cell of the UE will stop a service, for determining whether to delay or suspend the data transmission and to initiate or resume the data transmission before or after the current serving cell will stop the service.

16. A user equipment (UE) configured to communicate via a non-terrestrial network, the UE comprising:

at least one memory storing instructions; and at least one processor configured to process the instructions to:

perform a determination whether to delay or suspend a data transmission, based on at least one parameter for indicating whether the data transmission will be completed before a current serving cell of the UE will stop a service; and perform an initiation or a resumption of the data transmission, before or after the current serving cell will stop the service, based on the determination, wherein the determination is performed by determining whether to delay the data transmission to perform cell reselection to a new cell, based on the at least one parameter for indicating whether the data transmission will be completed before the current serving cell will stop the service, wherein the initiation is performed by initiating the data transmission, before or after the cell reselection, based on the determining, and wherein the at least one processor is further configured to process the instructions to apply, after the cell reselection, a random backoff timer or a predetermined delay timer before the initiating the data transmission.

17. A network node configured to communicate with a user equipment (UE) via a non-terrestrial network, the network node comprising:

at least one memory storing instructions; and at least one processor configured to process the instructions to:

transmit, to the UE, at least one parameter for indicating whether data transmission will be completed before a current serving cell of the UE will stop a service for determining whether to delay or suspend the data transmission and to initiate or resume the data transmission before or after the current serving cell will stop the service.

* * * * *